May 22, 1928.

W. T. HAWES

VACUUM TUBE

Filed July 8, 1926

1,670,356

INVENTOR
WILLIAM T. HAWES
BY Fetherstonhaugh & Co
ATTORNEYS

Patented May 22, 1928.

1,670,356

UNITED STATES PATENT OFFICE.

WILLIAM T. HAWES, OF MONTREAL, QUEBEC, CANADA.

VACUUM TUBE.

Application filed July 8, 1926. Serial No. 121,190.

This invention relates to new and useful improvements in vacuum tubes for radio receiving sets, and the object of the invention is to provide a vacuum tube in which means will be provided to prevent microphonic noises by dampening the vibratory period of the glass forming the tube, so that said noises will not interfere with the useful audio-frequency range upon which the set is mounted.

It is well known that particularly in radio receiving sets, tube noises occur, generally referred to as microphonic noises which are set up by extraneous vibrations. These vibrations cause distortion and inter-action between successive tubes and are due principally to sympathetic vibrations having a vibratory period equal to that of the thin glass walls of the tube. In order to mitigate the microphonic noises resort has been made to cushioned socket receptacles or suspension, but this does not solve the trouble completely since as stated above the thin walls of the tube can still be set into vibration by extraneous noises.

In my invention, I thicken the walls of the glass tube by forming therein a plurality of webs or fins so that the vibratory period of the tube becomes such as to no longer interfere with the audio-frequency range.

In the drawings which show various forms of my invention;—

Figure 1:
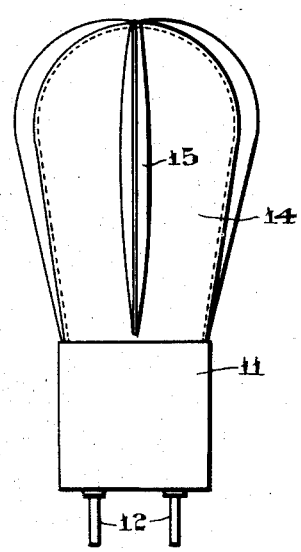
Figure 1 is a side elevation of a vacuum tube, the glass walls of which are provided with vertically disposed convex ribs.
Figure 2:
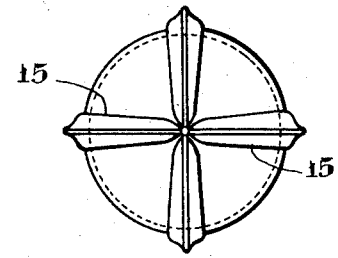
Figure 2 is a plan view of the tube shown in Figure 1.
Figure 8:
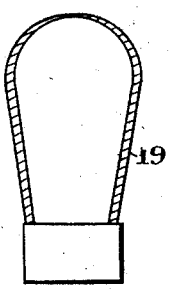
Figure 8 is a side sectional elevation of the tube the walls of which are of gradually decreasing thickness from the socket towards the top of the tube.
Figure 3:
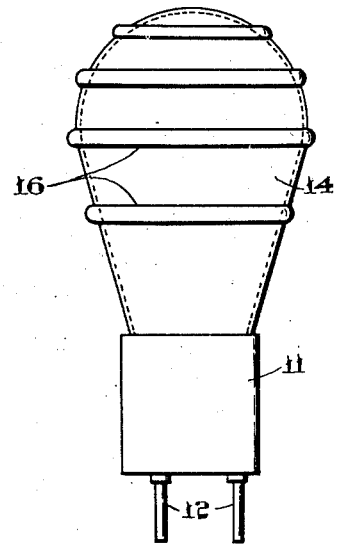
Figure 3 is a side elevation of a vacuum tube in which horizontal ribs are formed.
Figure 4:
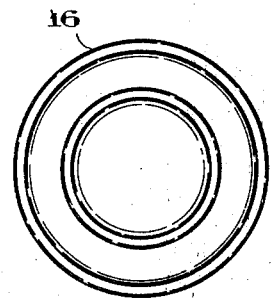
Figure 4 is a plan view of Figure 3.
Figure 5:
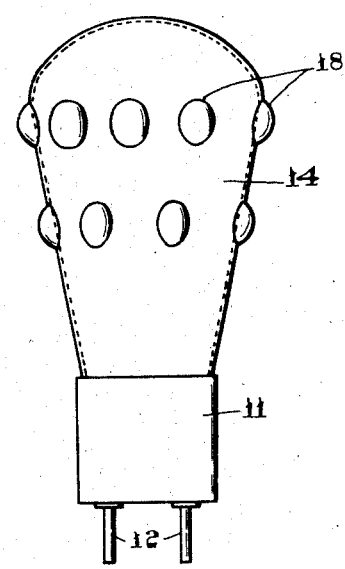
Figure 5 is a side elevation of a vacuum tube in which the glass walls are thickened with rows of nipples.
Figure 7:
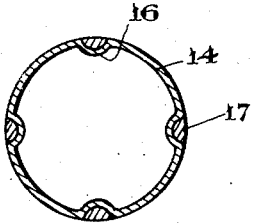
Figure 7 is a sectional plan of the tube shown in Figure 6 and taken on the line 7—7.
Figure 6:
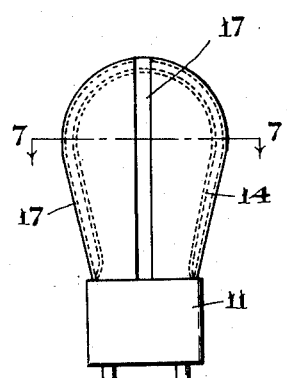
Figure 6 is a side elevation of a vacuum tube having grooves formed therein and cement filling the grooves.
Figure 9:
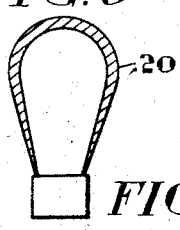
Figure 9 is a side sectional elevation of the tube the walls of which are of gradually increasing thickness from the socket towards the top of the tube.

Referring more particularly to the drawings, 11 designates a socket which may be provided with connection rods 12 of the type well known in this art. Extending upwardly from the socket are the grid, plate, and filament supports, not shown. Surrounding the filament, etc., is the glass tube 14, which is attached at one end to the socket and closed at the other end, the air within the tube being exhausted therefrom in the closing process. In Figures 1 and 2, I have shown vertically disposed convex ribs 15, formed integral with the tube and extending from the edge of the socket to the top of the tube. Four such ribs are shown but this number may be increased or decreased according to the size of the tube under manufacture. In Figures 3 and 4, the tube 14 is provided with horizontal ribs 16, formed integral with the tube. The ribs are spaced from one another and encircle the tube. In Figure 5 the tube is shown provided with horizontal rows of nipples 18 formed by thickening the walls of the tube at desired points. In Figures 6 and 7 external grooves 16 are formed in the tube and these grooves may be filled with a cement filling 17 which may if so desired, be made of a distinctive colouring. In Figure 8 the walls 19 of the tube is shown of gradually decreasing thickness that is the part of the wall near the socket is made thicker than that part of the wall at the top of the tube. Figure 9 shows the wall 20 of the tube gradually increasing in thickness, that is the wall at the socket is made thinner than that part of the wall near the top of the tube.

The foregoing are only a few of the methods which may be employed to thicken the tube to mitigate microphonic noises in the radio receiving set and many modifications may be made in the device without departing from the spirit of the invention.

In operation it has been found that by thickening the walls of the tube at intervals or by gradually thickening said walls, as shown in Figures 8 and 9, microphonic noises due to extraneous vibrations are practically eliminated in radio receiving sets.

Having thus described my invention, what I claim is;—

A vacuum tube for radio receiving sets said tube having corrugations formed in its wall, and means filling the corrugations to dampen the vibratory period of the glass.

In witness whereof, I have hereunto set my hand.

WILLIAM T. HAWES.